United States Patent [19]

Flecknoe-Brown

[11] Patent Number: 4,722,820
[45] Date of Patent: Feb. 2, 1988

[54] MOLTEN THEROMPLASTIC WEB FEEDING PROCESS

[75] Inventor: Anthony E. Flecknoe-Brown, Carlton, Australia

[73] Assignee: A.A.R.C. (Management) Pty. Limited, Richmond, Australia

[21] Appl. No.: 762,069

[22] PCT Filed: Nov. 7, 1984

[86] PCT No.: PCT/AU84/00227

§ 371 Date: Jul. 8, 1985

§ 102(e) Date: Jul. 8, 1985

[87] PCT Pub. No.: WO85/02142

PCT Pub. Date: May 23, 1985

[30] Foreign Application Priority Data

Nov. 11, 1983 [AU] Australia .............. PG2336

[51] Int. Cl.⁴ ........................... B29C 47/90
[52] U.S. Cl. ................ 264/210.2; 264/511; 264/522; 264/551; 264/555; 264/210.5; 264/289.3; 264/294; 425/325; 425/388
[58] Field of Search .......... 264/210.1, 210.2, 280, 264/346, 210.5, 285–286, 235, 289.3, 549, 511, 294, 522, 555, 40.6, 550–551; 425/66, 325, 384, 388, 324.1

[56] References Cited

U.S. PATENT DOCUMENTS

| | | | |
|---|---|---|---|
| 3,429,854 | 2/1969 | Siggel et al. | 264/292 |
| 3,886,250 | 5/1975 | Danko | 264/177 R |
| 3,931,383 | 1/1976 | Erlewine et al. | 264/286 |
| 3,963,813 | 6/1976 | Keith | 264/165 |
| 4,025,599 | 5/1977 | Keith | 264/285 |
| 4,304,539 | 12/1981 | Hagiwana et al. | 425/145 |

FOREIGN PATENT DOCUMENTS

| | | |
|---|---|---|
| 460849 | 5/1974 | Australia . |
| 0052470 | 5/1982 | European Pat. Off. . |
| 0891829 | 3/1962 | United Kingdom . |
| 1002356 | 8/1965 | United Kingdom . |
| 1108369 | 4/1968 | United Kingdom . |
| 1158593 | 7/1969 | United Kingdom . |
| 2126150 | 3/1984 | United Kingdom . |

OTHER PUBLICATIONS

Search Report

*Primary Examiner*—Jeffery Thurlow
*Attorney, Agent, or Firm*—Ladas & Parry

[57] ABSTRACT

A web of molten thermoplastics material (4) from extruder die (3) is fed through a pair of temperature controlled rolls (5) having a gap (13) of width less than that of the web thickness leaving the extruder die (3) and is fed from the rolls (5) directly and continuously under uniform tension to a thermoforming machine (9) (10) as a formable web (6) of substantially uniform temperature through its thickness.

8 Claims, 3 Drawing Figures

MOLTEN THEROMPLASTIC WEB FEEDING PROCESS

A number of thin wall packaging thermoforming plants now use direct in-line extrusion to feed hot webs of thermoplastic to traditional intermittent pressure forming presses.

The main advantages of in-line feeding are:

(a) Energy savings: re-heat of cold pre-extruded sheet is partially or wholly avoided;

(b) Material savings: in-line scrap regranulation reduces material losses and labour costs when recirculating the trim scrap;

(c) Labour savings: handling and clean storage of separately extruded roll-stock sheet is avoided.

Other advantages include easier web temperature control of the feed to the press, more uniform and controllable process conditions, work-in-progress inventory reductions and quality control savings.

The currently known methods of in-line feeding of webs, are derived from conventional extrusion sheet line technology. In these conventional type processes, the web is "s-rolled" around two or three temperature controlled rolls. The material thus makes intimate contact with the circumferential surface of the wide, cylindrical rolls, usually for a circumferential distance exceeding 100 mm.

In all cases, the material or at least the surface of the material, is chilled below its melting point, before it leaves the roll-stack. The warm but solid sheet is then usually fed to an accumulator section of one or more moveable rollers, which maintain tension in the web, as the intermittent feed of the sheet into the cycling forming press, takes place.

From the accumulator rolls, the web usually has to be reheated by radiant heaters. This is required to bring the actual sheet to be fed back to a uniform temperature in the longitudinal direction. Even a web which is fed directly from an extruder will have a uniform temperature drop in the longitudinal direction which must be corrected by partial reheat, unless the web speed is high or the distance between extruder and forming press is small.

Bellaplast Maschinenbau GmbH, West Germany have developed and patented (see U.S. Pat. No. 4,039,609) a modified version of the standard method of in-line extrusion feed for thermoplastic materials such as polypropylene. The Bellaplast method and machines for its operation rely on the cooling of the web surfaces to form supportive layers for the molten core of the web and for reheating of these layers by heat transfer from the core. Polypropylene, unlike other common thermoformable polymers, has a sharp melting point and a soft, fluid melt, which makes it very difficult to feed, in sheet form, into conventional thermoforming equipment of the Bellaplast type.

In the Bellaplast method, the sheet extruder feeds a thermoplastics material of regular structure into a series of two or more temperature-controlled rolls, partially "s" rolling the web on these rolls, to bring the web surface skin temperature to just below its crystalline melting point, so enabling sufficient strength to develop in the now solid-phase skins, to support the sagging molten core layer inside the web.

This enables the web to be fed to the intermittently fed press, via a single "dancing" roller, which helps to keep the web from becoming slack, whilst it is transported to the press.

Australian Patent Specification No. 460,849 details a continuously in-line with an extruder without the need for cool supporting skins in the web, or "dancing roller" web control arrangements of the Bellaplast type. However, the method disclosed therein suffers from the limitation of having no intermediate means of cooling the web to its best thermoforming temperature and no means of ensuring proper control of the web thickness across its width. The web issuing from an extruder slot die is usually not-uniform in thickness, either across its width or long its length, without further mechanical gauging.

It is an object of the present invention to provide a method and apparatus which will enable the continuous feeding in a sheet web form of thermoplastic material of regular structure, in a manner avoiding or minimizing the above noted disadvantages of the prior art.

Accordingly, the present invention provides a method of continuously thermoforming thermoplastic material wherein a web of said material issuing molten from an extruder is passed through a set of temperature-controlled rolls and from there to a thermoforming machine, characterized in that two rolls are set with a gap between them of predetermined uniform width which is less than the thickness of the web leaving the extruder, so that a bank of said material is formed before the gap and further characterised in that said material leaves the rolls in a hot fluid condition and is fed directly and continuously and under uniform tension to enter the thermoforming machine as a formable web having a substantially uniform temperature through its thickness.

In another aspect, this invention also provides apparatus for continuously thermoforming thermoplastic material including an extruder feeding a molten web of said material through a set of temperature controlled rolls to a thermoforming machine including a plurality of continuously moving moulds which maintain a substantially constant tension on the heated web, characterized in that the set of temperature controlled rolls is a pair of cooling rolls spaced apart by a gap of predetermined width less than the thickness of the web leaving the extruder and immediately adjacent to but spaced from the thermoforming machine a sufficient distance to enable said material issuing from said gap to enter the thermoforming machine as a formable web of a substantially uniform temperature through its thickness.

We have now developed a method of extruding hot webs into a two-roll pair of temperature controlled gauging rolls which have a fixed gap between them, lowering the web temperature from the extrusion temperature down to the best forming temperature and simultaneously ensuring that the web can be constantly fed to any non-intermittent continuous thermoforming process at a uniform thickness and at a uniform temperature through its thickness.

The fixed gap between the rolls is to be less than the thickness of the web leaving the extruder so that there will always be a finite area of contact between each opposed surface of the web and the respective adjacent roll surface. The speed of the web leaving the extruder and the speed of the rolls may be controlled to establish the volume of the bank of material formed before the roll gap. However, it will be appreciated that the volume will vary between a minimum in which no material from the extruded web thickness accumulates before the gap and travels along the roll surface against the direction of the roll rotation, and a maximum dependent upon the extent to which the material travels against the direction of rotation of each of the two rolls.

After leaving the roll gap, the web of material, in an entirely molten condition, travels directly to the thermoforming machine without intervening equipment for taking up, heating or further cooling the web. Any cooling imparted to the web surfaces by the rolls disperses through the thickness of the web, and no "frozen" skins are generated to aid in supporting the web during the travel of the web between the roll exit and the forming machine entry. The distance between these two points may be adjusted to achieve the required substantially uniform temperature and thickness of the web. Complete uniformity of temperature throughout the thickness of the web may not be achieved but substantial uniformity in which the cooler surface portions and the interior portion of the web are both in the molten state will suffice.

The success of the method of this invention depends upon utilizing a forming process which runs essentially continuously, so that the hot, molten material does not suffer intermittent changes in tension between the rolls and the forming zone of the thermoforming machine. The molten material leaving the rolls is supported by the continuous stretching extension resulting from the speed difference between the rolls and the thermoforming machine. This speed difference is adjusted as necessary for a particular material so that the material is extended faster than the rate at which it would naturally sag under its own weight, so maintaining a net supportive tension in the web.

The rolls are run at a relatively cool temperature (typically less than 60 Degrees °C.) and cooling and gauging of the web is carried out by maintaining a bank of material behind the slot, ensuring enough residence time of material on the roll surfaces to bring the web temperature down to its best, most stable forming conditions, generally just above the crystalline melting point of the material (165 Degrees °C. for homopolymer polypropylene). Varying the size of this bank varies both the temperature of the web, and also, to some extent, the temperature distribution through the web itself. A large and rolling bank causes mixing or calendering of the material as it enters the nip and causes it to exit at a uniform temperature through its thickness. A small non-rolling bank is desirable when co-extruded multilayer materials are to be processed so that mixing of the different materials in the respective layers can be avoided.

All of the common thermoplastic polymers can be processed by this means. These include: polymers and copolymers of olefins including ethylene and propylene; polyamides including the nylons; homopolymers of styrene and copolymers of styrene including acrylonitrile-butadiene-styrene copolymers; polycarbonates; and polyvinyl chloride. For all these specifically named polymers, the web entering the thermoforming machine is preferably at a temperature sufficiently above the crystalline melting point of the polymer to be formable without sensitivity to minor web-temperature variation. However, it is preferred that the web temperature at this point in the process is not more than 50° C. above the melting point.

There is a further group of common thermoplastic polymers where the temperature of the web material entering the thermoforming machine can be less than the polymer materials crystalline melting point and still be readily formable into hollow objects using forming differential air pressures of less than 15 psi. This group includes the polyalkylene terephthalates and their copolymers. Polyethylene terephthalate is a commonly used member of this group.

In processing polyethylene terephthalate (PET) and related polyalkylene terephthalates into heat stable containers, the method of the invention is particularly advantageous with certain adaptations. PET progressively crystallizes from its amorphous hot extruded state (above 230° C.), over time and is readily formable into containers at temperatures below its crystalline melting point, if its percentage crystallinity at the time of forming is less than about 10%. If its starting crystallinity lies between 3 and 10% (as can be determined by measuring its density), this material can then be heat-set in hot forming moulds to give oven-proof containers capable of being reheated in domestic ovens to temperatures up to 200° C. without distortion of shape.

The state of crystallization at which forming takes place is quite critical for successful heat setting to be achieved and as this is time and temperature dependent, it is desirable to be able to run a continuous process whereby time and temperature can be made invariant at a given point on the web at which forming can begin. Such conditions are easily sustained in a continuous process, but are difficult to control in an intermittent, press-fed process. The web feeding method of our invention may be used to bring a PET web to its best temperature for crystallization to progress (between 140° and 170° C.), whilst controlling the web thickness. The distance between the roll pair and the forming machine may then be adjusted so that the PET web arrives at the forming station with just the right degree of crystallization for proper forming and heat setting to take place.

The invention will now be more fully described with reference to the accompanying drawings in which.

Figure 1:
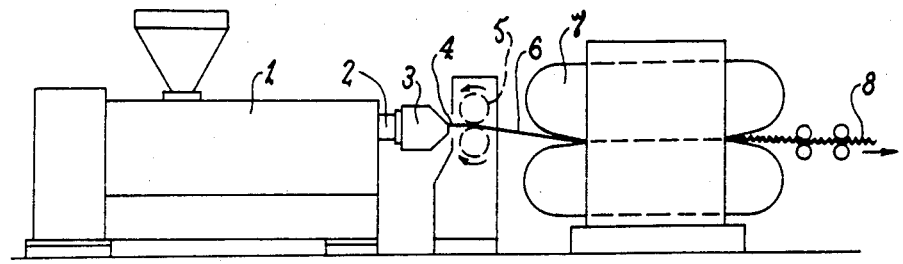
FIG. 1 is a diagrammatic representation of an in-line extrusion fed continuous thermoforming line utilizing the method of the invention.

As shown in FIG. 1, a single extruder 1 or multiple extruders of known construction are used to continuously feed molten thermoplastic material at a relatively constant temperature and material delivery rate under pressure to a heated adaptor or co-extrusion feedblock 2. The heated adaptor 2 usually maintains the thermoplastic material in a molten state, its temperature typically greater than 50° C. above the material melting point.

The single or combined streams of material are fed from the adaptor or feedblock 2 into a heated slot-die 3. The molten material exits the die 3 in the form of a flat, wide, hot web 4 whose thickness depends on the gap between the die lips and whose width is controlled by the open width of the die lips. When multiple feeds of different materials are fed into the die via the adaptor 2, the different material streams leave the die slot in separate thin layers which make up the flat sheet web 4. The molten material web 4 continuously exits the slot die at a temperature typically greater than 50° C. above its melting point.

The speed of the web 4 as it exits the slot-die depends on its width, its thickness and the rate at which the extruders 1 feed the material to the die 3 via the adaptor 2.

A pair of oppositely driven temperature-controlled rolls 5 are maintained in a fixed relationship to each other so that a uniform slot-gap is maintained between them. The arrows denote the direction of rotation of each driven roll, which usually, but not necessarily, each rotate with the same circumferential speed as the other.

The circumferential, or surface speed of the rolls 5 is usually similar to or greater than the linear speed of the web 4, exiting the slot die 3. The slot-gap between the rolls 5 is less than the gap between the lips of the slot-die 3.

The still-molten material 6 leaves the rolls cooler and with uniform thickness. As explained above, for many common thermoplastic materials the molten material preferably leaves the rolls and stabilizes to a substantially uniform temperature not greater than 50° C. above its melting point. For materials such as PET, the material leaves the rolls below its melting temperature but still in a substantially amorphous and readily formable condition.

The distance between the rolls 5 and the thermoforming machine 7 is adjustable so that the dwell time of the material 4 between these points can be adjusted to allow the temperature difference between the cooler surface portions of the material and the hotter interior of the material to substantially disappear.

The continuous thermoforming machine 7 is typically, but not necessarily of the general configuration shown in AU No. 460,849 or other commonly used continuous thermoforming machine configurations, such as a continuously rotating wheel on which vacuum cavities are mounted. Such machines require continuous delivery of a uniform molten web 6 at a linear speed which is usually the same as, or greater than the circumferential surface speed of the rolls 5.

This ensures that sufficient longitudinal tension is maintained in the web 6 to prevent it sagging down or unnecessarily stretching in the centre and again becoming of non-uniform thickness across its width.

The softer the melt of the material, i.e. the higher its Melt Flow Index, the greater the speed difference will have to be between the linear speed of the web 6 immediately it enters the forming machine 7 and the surface speed of the temperature controlled rolls 5.

Figure 2:
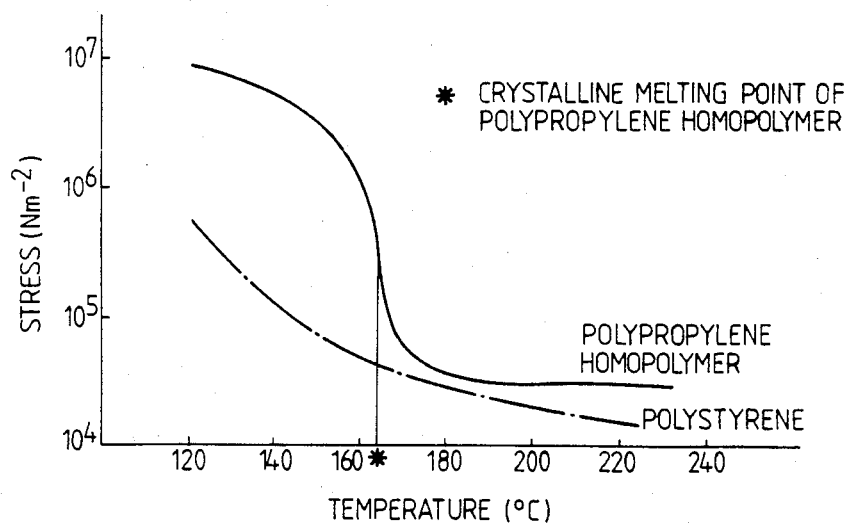
FIG. 2 is a graph showing the variation of elastic response with temperature for polypropylene homopolymer and for polystyrene.

FIG. 2 illustrates the importance of maintaining all the web above its crystalline melting point when forming materials such as polypropylene. The curves show the variation of elastic response with temperature when applying the stress required for Hencky strain=1.0 (Hencky strain 1.0=draw ratio 2.72).

The curve for polypropylene shows the sensitivity of the elastic response to small differences in temperature in the area of the crystalline melting point. By contrast, materials such as polystyrene exhibit no such sensitivity.

Bellaplast use this rapid variation in elastic response to temperature by cooling the outer skins of molten polypropylene to below the crystalline melting point, so that the skins become strong enough to support the entire web.

Figure 3:
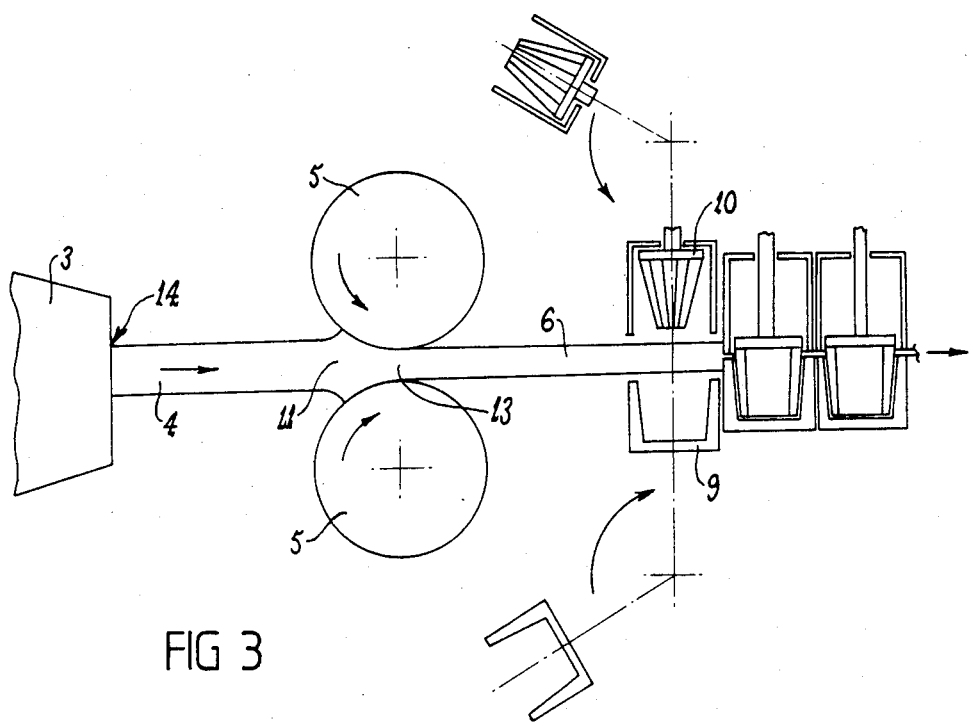
FIG. 3 is a more detailed representation of that part of the line of FIG. 1 where the pair of rolls used in accordance with our method, are located.

We now refer to FIG. 3 which shows in more detail how the hot web roller gauging method of our invention controls the temperature and thickness uniformity of molten webs which are to be fed to continuously moving downstream processes.

The web 4 leaves the die-lips 14 at the materials extrusion temperature (typically 200° C. to 300° C.). The web 4 has a poor uniformity of thickness but is predominantly thicker than the gap 13 between rolls 5. This web thickness varies across the width of the web, due to inaccurate setting of the gap between the die-lips 14; build-up of material at points on the die-lips 14; and varying temperatures within the die 3 from one side to the other.

The web thickness varies in the longitudinal or flow direction due to surges in the extruder screw speed and variations in the rate of feed of material into the extruder or into the feed zone of the screw.

At the position denoted by reference 11, a bank of material is formed as the non-uniform thick, hot web material begins to be squeezed by the temperature controlled rolls 5, set with a fixed gap between them at position 13 and usually held at a substantially lower temperature (for example, 40° to 70° C.) than the temperature of the incoming web (for example, 200° to 300° C.).

The gap between the rolls at 13 is less than the entering web thickness, so that a bank of material develops behind the rollers. As shown in FIG. 3, the bank of material extends back along the surface of each roll 5 against the direction of movement of the roll. However, even if the relative speed of the web 4 and the rolls 5 is such that the bank will not extend back in this manner, a reservoir or bank of material will be formed as the thicker web 4 is rolled down to the thickness of the roll gap at 13. This enables a finite surface of contact to be established between the web and the rolls, extending from the position at which the bank starts with the contact of web 4 with the rolls 5, to the gap 13, and heat transfer from the hot web to the cooler rolls takes place, preferably cooling the web to just above its best formable temperature, as it leaves contact with the rolls 5.

The temperature settings required are established by varying the roll temperatures and/or by varying the roll speed to increase or decrease the size of the rolling bank of material. The temperature of the web leaving the rolls is dependent on the extent to which the web has contacted the rolls, the temperature of the rolls, and the temperature at which the material leaves the extruder die. If the thickness, speed and temperature of the web fed to the rolls is constant, and roll speed is constant, the temperature drop imparted to the web will alsio be constant. However, if the thickness and/or speed of the fed web varies, the contact between the web and the rolls will vary in inverse proportion to the variation in thickness and/or speed, thus providing a self-correcting means of maintaining a stable web exit temperature.

The hot web leaves the rollers for further processing in a web 6 of uniform thickness which depends both on the roll gap and on the speed at which the downstream process collects or pulls the web, in relation to the circumferential speed of the rolls. In FIG. 3, the aforesaid downstream process is represented by a series of moving punches 10 and dies 9 which are smoothly progressing to the right whilst clamping down on the web.

The bank of material takes up all variations in the thickness of the incoming web 4 and provides a reservoir of hot material, out of which a uniform exiting web 6 can be ensured.

The general benefits of in-line extrusion feeding of sheet webs to downstream process, were discussed earlier.

The specific benefits of our invention which enables continuous feeding of molten webs to non-intermittent combining or forming processes include:

1. Ease and stability of web temperature control. The invention provides a simple, stable and low-equipment-cost method of molten web temperature control, utilizing controlled temperature rollers, together with a small bank of hot material. Both parameters can be varied independently to give a high degree of web temperature control and self-correcting temperature stability.

2. Energy savings. No further radiant or other heating is required. The hot extrudate provides all of the heat energy needed for both the web feeding process itself and for the downstream processing of it.

3. Easy and stable web thickness control. The accumulated material in the bank behind the roll gap provides a "reservoir" to feed the constant thickness hot web issuing from the fixed gap slot between the rolls.

EXAMPLE

The ability of the present invention to improve a continuous thermoforming process was demonstrated by using gauging rolls as described above in-line between an extruder and a continuous cuspation-dilation thermoforming machine of the kind described in Australian Pat. No. 534,392 and U.S. Pat. No. 4,288,401. For convenience the method, apparatus and products of the present invention are referred to below by the name Hitek.

A "Take Out" food container or tub of approximately 16 oz. capacity was made from homopolymer polypropylene (PP) during an eight hour production run on Hitek equipment. The mean aim weight was 13.2 grams. Samples were taken from eight cavities every fifteen minutes the first hour and then every thirty minutes for the remainder of the run. 64,350 containers were made during the continuous run. During start-up, eleven kilograms of web were lost prior to obtaining cutting conditions and five kilograms of tubs were lost during the production run due to misfeed at the cutting station. This 5 kg. represented about 375 tubs from the 64,350 produced. All reject tubs and web were suitable for regrind.

Twelve commercially used 16 oz. cottage cheese tubs made from high impact polystyrene (HIPS) using conventional sheet thermoforming techniques were purchased for purposes of comparison. They were washed and dried thoroughly prior to testing. These containers were made from eight different molds on the same day and were packed in the same plant.

Crush Strength

Crush strength values were obtained using an Instron with a cross head speed of 2 inches/minute, a chart speed of 5 inches/minute and a range of 0–100 lbs. for Hitek samples and 0–200 lbs. for the controls. Each of the eight Hitek cavities was sampled for each hour of production for a total of 64 containers. All twelve of the controls were tested.

|  | Hitek PP | HIPS |
| --- | --- | --- |
| Nominal wt. g. | 13.2 | 16 |
| Ave. Crush Force lbs. | 74.3 | 107 |

-continued

|  | Hitek PP | HIPS |
| --- | --- | --- |
| Max. Crush Force | 80 | 147 |
| Min. Crush Force | 67 | 90 |
| Range | 13 | 57 |
| Standard Deviation | 2.6 | 17.2 |

Both the range and the standard deviation of the crush force of the Hitek containers were appreciably smaller than the control product indicating better control over the thickness and temperature of the incoming web and in its forming.

As a matter of interest, if it were desired to obtain the same average crush on the Hitek containers as with the controls, it was calculated that the wall thickness of the Hitek container would have to be increased to 19.4 mils from the present 17.2 average with a weight increase from 13.2 grams to 15.3 grams as compared to the control average weight of 16.36 grams. In view of the lower standard deviation on crush of the Hitek container, the aim weight could probably be lower than the 15.3 grams to assure that values below the minimum would not be obtained.

Container Weight

Each of the eight cavities of the Hitek tubs was sampled seventeen times during the production run for a total of 136 samples. The average weight was 13.231 grams with a standard deviation of 0.369 grams. Minimum and maximum values were 12.236 gm. to 14.281 gm. respectively. The controls averaged 16.362 gm. with a standard deviation of 0.63 gm. Ranges were from 15.670 gm. to 17.583 gm. As in the case of crush strength, the smaller standard deviation of the Hitek container indicated substantially better starting web temperature and thickness control than the thermoformed HIPS samples.

Wall and Base Thickness

Uniformity of containers depends on web temperature and thickness control. Each of 64 Hitek containers and 12 controls were measured at 12 points around the side walls (top, middle and bottom in each of four quadrants) and at 4 points around the side wall ¼" above the base where crush failure occurred. Results were as follows.

|  | Hitek | Control |
| --- | --- | --- |
| 12 point average | 17.2 mils | 18.3 mils |
| Std. Deviation | 0.42 | 1.03 |
| 4 points just above the base | 17.2 mils | 16.5 mils |
| Std. Deviation | 0.86 | 0.91 |

Hitek products showed a narrower range of variability than the thermoformed HIPS controls.

Based on crush, side wall and base thickness and weight, the process was in control and is capable of manufacturing good quality containers from polypropylene homopolymer. With respect to each of the tests, the standard deviation of the data taken on the Hitek containers was smaller than that of the controls showing less variability of the Hitek process than with conventional thermoforming.

Comparisons were made of minimum and maximum values and the standard deviations for the various tests of the Hitek containers versus the controls. While the absolute values differed because of different aim specifications, the standard deviation of crush strength was 2.6 lbs. for Hitek vs. 17.2 lbs. for the control, 0.42 mil for side wall thickness vs. 1.03 mils for the control, 0.69 mil for the base thickness vs. 1.71 mils for the control, and 0.37 g. for weight vs. 0.63 g. for the control. Ideally, the controls should have been made from polypropylene, but commercial containers in the appropriate size were not available. However, this should favor the Hitek method even more because HIPS is relatively easy to thermoform whereas polypropylene is considerably more difficult.

I claim:

1. A method of continuously thermoforming thermoplastic material wherein a web of said material issuing molten from an extruder is passed through a set of temperature controlled rolls and from there to a continuous thermoforming machine the improvement comprising: setting 2 rolls with a gap between them of predetermined uniform width less than the thickness of the web leaving the extruder so that a bank of thermoplastic material is formed before the gap said material leaving the rolls in a hot fluid condition; feeding, directly and continuously the material to the thermoforming machine as a formable web having a substantially uniform temperature through its thickness, the web of material between the rolls and the thermoforming machine being supported under uniform tension by imparting a constant extension to the material from a differential between the speed of the rolls and the speed of a plurality of moving moulds carrying the web through the thermoforming machine.

2. A method as claimed in claim 1 wherein the bank of material is formed of sufficient volume to enable continuous mixing movement of the material forming the bank.

3. A method as claimed in claim 1 wherein the bank of material is formed of such volume that the material forming the bank is passed through the bank without substantial mixing.

4. A method as claimed in claim 1 wherein the temperature of the formable web is above the melting point of the thermoplastic material.

5. A method as claimed in claim 1 wherein the temperature of the web entering the thermoforming machine is not more than 30° C. above the melting point of the thermoplastic material.

6. A method as claimed in claim 1 wherein the temperature of the web entering the thermoforming machine is controlled so that crystallization has commenced but the percentage crystallinity of the material at this point is less than about 10%, and the web is formed and heat-set in heated forming moulds to form oven-proof containers.

7. A method as claimed in claim 6 wherein the material is a polyalkylene terephthalate.

8. A method, as in claim 1 wherein maintaining said bank of material behind the gap serves to both cool and gauge the web.

* * * * *